(12) United States Patent
Sanada et al.

(10) Patent No.: US 6,725,116 B2
(45) Date of Patent: Apr. 20, 2004

(54) PRODUCTION MANAGEMENT SYSTEM

(75) Inventors: Mutsurou Sanada, Tokyo (JP); Yoshiyuki Ode, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 171 days.

(21) Appl. No.: 09/756,170

(22) Filed: Jan. 9, 2001

(65) Prior Publication Data

US 2001/0015864 A1 Aug. 23, 2001

(30) Foreign Application Priority Data

Jan. 20, 2000 (JP) .................................... P.2000-012010

(51) Int. Cl.⁷ ............................................. G06F 19/00
(52) U.S. Cl. ........................ 700/115; 700/116; 700/95
(58) Field of Search .......................... 700/95, 103–107, 700/109, 110, 115, 116, 215, 216, 219–222, 225–227, 244

(56) References Cited

U.S. PATENT DOCUMENTS

| 4,611,380 | A | * | 9/1986 | Abe et al. ...................... 29/430 |
| 4,700,309 | A | * | 10/1987 | Naito et al. ................... 364/468 |
| 5,202,836 | A | * | 4/1993 | Iida et al. ..................... 364/468 |
| 5,419,541 | A | * | 5/1995 | Stevens ........................ 270/57 |
| 5,434,792 | A | * | 7/1995 | Saka et al. ................... 364/468 |
| 5,541,395 | A | * | 7/1996 | Hill et al. .................... 235/380 |
| 5,649,076 | A | * | 7/1997 | Nishizaka et al. ........... 395/119 |
| 5,774,875 | A | * | 6/1998 | Medeiros et al. ............. 705/28 |
| 5,907,489 | A | * | 5/1999 | Elliott .......................... 364/468.03 |
| 5,917,726 | A | * | 6/1999 | Pryor ........................... 364/468.01 |
| 6,002,650 | A | * | 12/1999 | Kuribayashi et al. ........ 367/468.24 |
| 6,381,509 | B1 | * | 4/2002 | Thiel et al. ................... 700/115 |
| 6,516,239 | B1 | * | 2/2003 | Madden et al. .............. 700/115 |

FOREIGN PATENT DOCUMENTS

| JP | 5-77552 | 10/1993 |
| JP | 6-227462 | 8/1994 |

* cited by examiner

*Primary Examiner*—Leo Picard
*Assistant Examiner*—Sean Shechtman
(74) *Attorney, Agent, or Firm*—Smith, Gambrell & Russell, L.L.P.

(57) ABSTRACT

In production management system of a vehicle, at a parts assembling step, a computer terminal 12 reads the product-specific information and the parts-specific information from an information storage medium 2 through an information read/write unit 3. On the other hand, a bar-code reader 5 reads the product-specific information (e.g., the vehicle code) from the completion check indicator 4 of a vehicle body 1 and the parts-specific information and the parts-intrinsic information from parts 6. And, the computer terminal 12 compares the product-specific information with each other and the parts-specific information with each other and writes, when both the individual comparisons are coincident, the parts-intrinsic information in the information storage medium 2 through the information read/write unit 3 to allow the parts 6 to be assembled in the vehicle body 1. When either of the comparisons results in incoincidence, on the other hand, a warning of incoincidence is issued from a warning unit 7 to avoid the assembly of the parts 6.

4 Claims, 3 Drawing Sheets

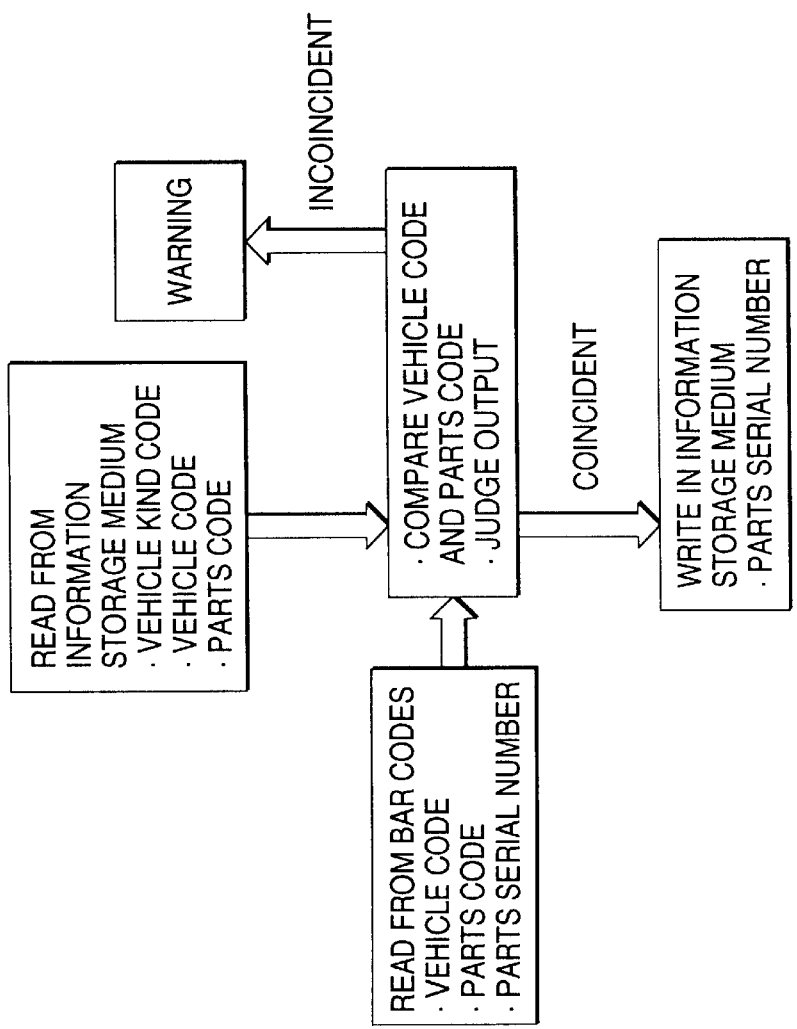
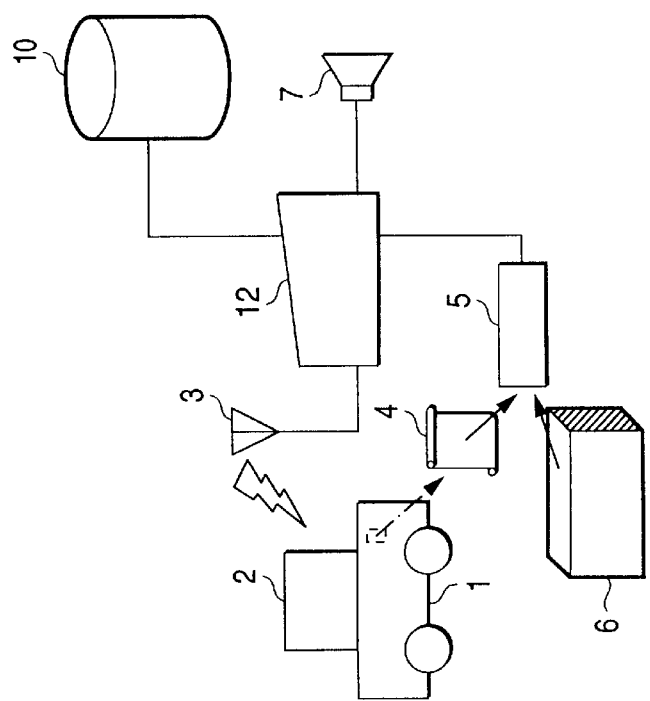

PRODUCTION MANAGEMENT SYSTEM

BACKGROUND OF THE INVENTION

1. Field of the Invention

The present invention relates to a product such as a vehicle and, more particularly, to a production management system for mounting parts accurately on a vehicle body on the basis of the information recorded in an information storage medium such as an ID card.

2. Description of the Related Art

In recent years, for the production management of a vehicle or the like, an information storage medium for reading/writing information by making use of electromagnetic waves or the like is widely used to instruct parts or the like to be assembled in the vehicle, in accordance with the information read from the information storage medium.

In Japanese Patent Unexamined Publication No. Hei. 6-227462, for example, there is disclosed a production management system for instructing the specifications of parts to be assembled, on the basis of an instruction from a host computer. In Japanese Patent Examined Publication No. Hei. 5-77552, moreover, there is disclosed an automobile production management system for reading information at an assembling step by using an information transmitting medium to instruct the specifications.

By this production management system, it is possible to instruct the parts to be assembled, properly for the vehicles of different specifications, i.e., for the vehicles of different parts to be mounted, thereby to improve the production yield.

When vehicles of many specifications are to be produced, however, there is no means for warranting whether or not an assembling the actual parts is accurately made, even if the instruction is accurate. Further, even if the parts of correct specifications are assembled, it is difficult to specify the parts actually assembled and to specify the product having the parts assembled in case that the parts possibly have troubles.

SUMMARY OF THE INVENTION

The invention has been conceived in view of the background thus far described and has an object to provide a production management system capable of assembling parts accurately in a product and to specify the product from the assembled parts.

In order to achieve the above-specified object, according to the invention as set forth in claim 1, there is provided a production management system for assembling parts in a target product on the basis of an information storage medium in which the product-specific information of said product and the parts-specific information of said parts, characterized by comprising: medium information reading means for reading said product-specific information and said parts-specific information from said information storage medium; product-specific information reading means for reading the product-specific information from an actual product; parts-specific information reading means for reading the parts-specific information from the parts to be actually assembled; and comparison output means for comparing the information, as read by said product-specific information reading means, and the information, as read by said parts-specific information reading means, with the information read by said medium information reading means, to output the comparison result.

In the production management system according to a first aspect of the invention, specifically: the medium information reading means reads the product-specific information and the parts-specific information; the product-specific information reading means reads the product-specific information from the actual produce; and the parts-specific information reading means reads the parts-specific information from the parts to be actually assembled. Moreover, the comparison output means compares the information read by the product-specific information reading means and the information read by the parts-specific information reading means, with the information read by the medium information reading means, and outputs the comparison results.

In a production management system of the first aspect, according to a second aspect of the invention, said comparison output means outputs a warning when either the information read by said product-specific information reading means or the information read by said parts-specific information reading means is incoincident from the information read by said medium information reading means. The erroneous assembly of the parts is informed by the warning so that the erroneous assembly on the production is effectively prevented.

In a production management system of the first and second aspect, according to a third aspect, said parts-specific information reading means reads not only said parts-specific information from said actually assembled parts but also a parts-intrinsic information intrinsic to the individual parts, and said comparison output means records said parts-intrinsic information in said information storage medium when the information read by said product-specific information reading means and the information read by said parts-specific information reading means are coincident to the information read by said medium information reading means. From the parts-intrinsic information, there can be specified the product on which the parts are mounted.

BRIEF DESCRIPTION OF THE DRAWINGS

FIG. 2 is an explanatory diagram of a step at a parts assembling stage; and

DETAILED DESCRIPTION OF THE PREFERED EMBODIMENT

Figure 1:
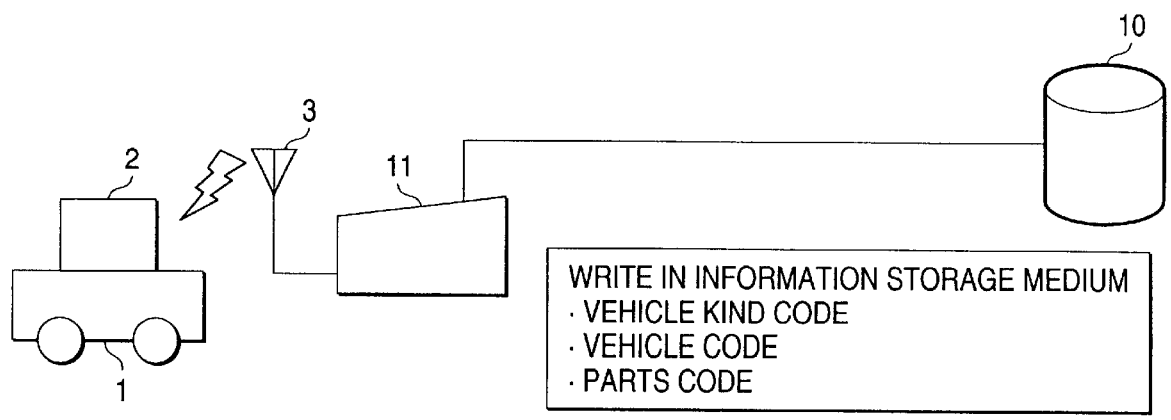
FIG. 1 is an explanatory diagram of a step at a production preparing stage.
Figure 3:
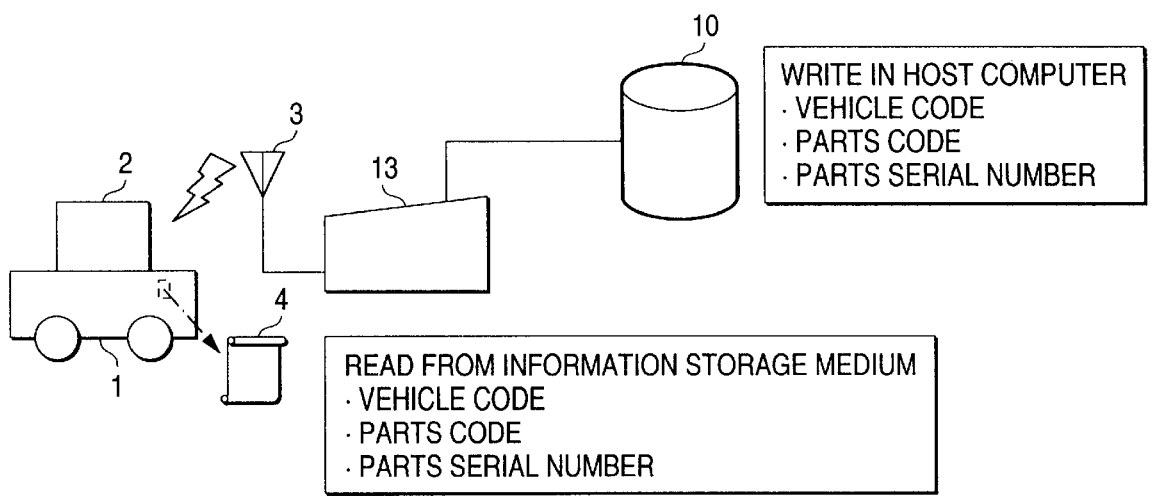
FIG. 3 is an explanatory diagram of a step at a assembly ending stage.

An embodiment of the invention will be described with reference to the accompanying drawings. In FIGS. 1 to 3 showing one embodiment of the invention: FIG. 1 is a diagram explaining a step at a production preparing stage; FIG. 2 is a diagram explaining a step at a parts assembling stage; and FIG. 3 is a diagram explaining a step at an assembly ending stage.

The embodiment is exemplified by a production management system for producing vehicles as products. This projection management system manages the production line which includes a preparation step, a step of assembling a plurality of parts, and an end step.

By this production line, moreover, predetermined parts are assembled in a vehicle body 1 which is carried and transferred on a truck or the like along the line. At the individual steps of the like, on the other hand, there are arranged computer terminals 11, 12 and 13 which are connected with a host computer 10 to manage the individual production steps.

First of all, at the preparation step, as shown in FIG. 1, in response to an instruction from the host computer 10, the computer terminal 11 causes an information read/write unit 3 to write product-specific information (e.g., a vehicle kind code or a vehicle code) and parts-specific information (e.g., a parts code) in an information storage medium 2, as set at a predetermined position of the truck. After this, the vehicle body 1 is transferred to the parts assembling step.

Next, at the parts assembling step, as shown in FIG. 2, in response to an instruction from the host computer 10, the computer terminal 12 causes the information read/write unit 3 to read the product-specific information (e.g., the vehicle kind code or the vehicle code) and the parts-specific information (e.g., the parts code) from the information storage medium 2.

On the other hand, the product-specific information (e.g., the vehicle code) of a completion check indicator 4 attached to the vehicle body 1 is read either automatically or by an operator through a bar-code reader 5 and is transmitted to the computer terminal 12.

Moreover, the parts-specific information (e.g., the parts code) and the parts intrinsic information (e.g., parts serial number) of parts 6, as prepared to be assembled, are read either automatically or by the operator through the bar-code reader 5 and are transmitted to the computer terminal 12.

And, when there become complete the aforementioned three information: the product-specific information (e.g., the vehicle kind code or the vehicle code) and the parts-specific information (e.g., the parts code) from the information storage medium 2; the product-specific information (e.g., the vehicle code) from the completion check indicator 4; and the parts-specific information (e.g., the parts code) and the parts intrinsic information (e.g., the parts serial number) from the parts 6, the computer terminal 12 makes a comparison between the product-specific information (e.g., the vehicle code) from the information storage medium 2 and the product-specific information (e.g., the vehicle code) from the completion check indicator 4, and a comparison between parts-specific information (e.g., the parts code) from the information storage medium 2 and the parts-specific information (e.g., the parts code) from the parts 6.

When the individual comparisons reveal that both of them are identical, the computer terminal 12 writes the parts intrinsic information (e.g., the parts serial number) from the parts 6, in the information storage medium 2 through the information read/write unit 3. At this time, the operator may be informed by a blue lamp or chime of the coincidence of the comparisons. With both the comparisons being identical, the parts 6 are assembled in the vehicle body 1.

When either the comparison between the product-specific information (e.g., the vehicle code) or the comparison between the parts-specific information (e.g., the parts code) is incoincident, on the other hand, a warning of the incoincidence is issued from a warning unit 7. This warning may be made by a red lump or the like or may allow a discrimination of which comparison is incoincident. With this result of incoincidence, the operator remakes the preparation or the like for proper parts and renews the parts assembling step.

In the embodiment, therefore: the computer terminal 12 and the information read/write unit 3 construct medium information reading means; the computer terminal 12 and the bar-code reader 5 construct product-specific information reading means and parts-specific information reading means; and the computer terminal 12 is constructed to have a function as comparison output means. The parts assembling step is individually repeated, and the vehicle body 1 is then transferred to the line ending step.

At this line ending step, as shown in FIG. 3, the computer terminal 13 reads the product-specific information (e.g., the vehicle code), the parts-specific information (e.g., the parts code) and the parts-intrinsic information (e.g., the parts serial number) from the information storage medium 2 through the information read/write unit 3, and transmits them to the host computer 10. And, this host computer 10 manages the information in a batch (after the selling of the vehicle) as the merchandise history.

Thus according to the embodiment, comparisons are made between the product-specific information (e.g., the vehicle code) from the information storage medium 2 and the product-specific information (e.g., the vehicle code) from the completion check indicator 4 and between the parts-specific information (e.g., the parts code) from the information storage medium 2 and the parts-specific information (e.g., the parts code) from the parts 6, so that the assembly of the parts 6 is allowed in the case of the coincidence. It is, therefore, possible to prevent the erroneous parts reliably from being assembled in the vehicle body 1. When an intrinsic one of the assembled parts requires some maintenance after the vehicle was shipped and sold, on the other hand, the vehicle having the target part assembled can be simply specified by retrieving the information of the historical management of the host computer 10, so that a quick response can be made to the maintenance.

Here, the embodiment of the invention has been described by exemplifying the production management system for vehicles. However, the invention should not be limited to the vehicles but could naturally be applied to other products.

According to the first aspect of the invention, as has been described hereinbefore, the comparisons are made between the product-specific information read from the information storage medium and the product-specific information read from the actual products and between the parts-specific information read from the information storage medium and the parts-specific information read from the parts to be actually assembled, and their results are outputted, so that the parts can be accurately assembled in the product.

According to the second aspect, the warning is outputted when either the comparison result between the product-specific information or the comparison result between the parts-specific information is incoincident. Therefore, it is possible to prevent the erroneous parts reliably from being assembled in the product.

According to the third aspect, the parts-intrinsic information intrinsic to the individual parts is recorded in the information storage medium when both the comparison result between the product-specific information and the comparison result between the parts-specific information are coincident. Therefore, it is possible to manage the histories of products, as having the product-specific information, the parts-specific information and the parts-intrinsic information recorded, and it is easy to specify the product from the assembled parts. In addition to the effects of the first and second aspect, there is achieved an effect that it is possible to improve the maintainability of the product.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A production management system for a vehicle for assembling parts in a target product on the basis of an information storage medium recording the product-specific information of said product and the parts-specific information of said parts, comprising:

medium information reading unit for reading said product-specific information and said parts-specific information from said information storage medium;

product-specific information reading unit for reading the product-specific information from an actual product;

parts-specific information reading unit for reading the parts-specific information from the parts to be actually assembled, and for reading the parts-intrinsic information intrinsic to individual parts; and comparison output unit for recording said parts-intrinsic information in said information storage medium when the information read by said product-specific information reading unit and the information read by said parts-specific information reading unit are coincident to the information read by said medium information reading unit, and for comparing the information read by said product-specific information reading unit and the information read by said parts-specific information reading unit, with the information read by said medium information reading unit, to output the comparison result.

2. A production management system according to claim 1, wherein said comparison output unit outputs a warning when at least one of the information read by said product-specific information reading unit or the information read by said parts-specific information reading unit is incoincident from the information read by said medium information reading unit.

3. A method for a production management for a vehicle for assembling parts in a target product on the basis of an information storage medium recording the product-specific information of said product and the parts-specific information of said parts, comprising:

(a) reading said product-specific information and said parts-specific information from said information storage medium;

(b) reading the product-specific information from an actual product;

(c) reading the parts-specific information from the parts to be actually assembled;

(d) comparing the information read by said step (b) and the information read by said step (c), with the information read by said step (a), to output the comparison result, and (e) reading not only said parts-specific information from said actually assembled parts but also the parts-intrinsic information intrinsic to the individual parts, and (f) recording said parts-intrinsic information in said information storage medium when the information read by said step (b) and the information read by said step (c) are coincident to the information read by said step (a).

4. The method according to claim 3, comprising (g) outputting a warning when at least one of the information read by said step (b) or the information read by said step (c) is incoincident from the information read by said step (a).

* * * * *